United States Patent [19]

Matson

[11] 4,147,893
[45] Apr. 3, 1979

[54] GAUGING SYSTEM PROVIDING REMOTE READOUT OF LIQUID LEVELS IN GASOLINE STORAGE TANKS

[76] Inventor: Carl G. Matson, 10953 Rivercrest Dr., Little Rock, Ark. 72212

[21] Appl. No.: 903,196

[22] Filed: May 5, 1978

[51] Int. Cl.² .................... H04M 11/00; G01F 23/14
[52] U.S. Cl. .............................. 179/2 A; 179/2 AM; 73/301; 73/302
[58] Field of Search .............. 179/2 A, 2 AM; 73/301, 73/302

[56] References Cited

U.S. PATENT DOCUMENTS

| | | | |
|---|---|---|---|
| 1,765,598 | 6/1930 | McCoy et al. | 179/2 A |
| 2,581,427 | 1/1952 | Matthews | 73/302 |
| 4,064,752 | 12/1977 | Murphy, Jr. et al | 73/302 |
| 4,068,096 | 1/1978 | Rattenborg et al. | 179/2 A |

*Primary Examiner*—William C. Cooper
*Assistant Examiner*—Kenneth A. Chayt

*Attorney, Agent, or Firm*—Emrich, Root, O'Keefe & Lee

[57] ABSTRACT

A controller at a monitor location generates interrogate signals which are transmitted over a telephone line to a transmitting unit associated with a plurality of underground gasoline storage tanks. The transmitting unit responds to the interrogate signals to selectively couple pressure sensing lines to a pressure sensing transducer. Each line extends into a different one of the storage tanks and provides a pressure which is proportional to the depth of the liquid in the corresponding tank. As each line is coupled to the transducer in sequence, the transducer provides an output voltage corresponding to the sensed pressure. The output voltage controls a transmitter of the transmitting unit which generates an audio signal related in frequency to the sensed pressure, and the frequency signal is transmitted over the telephone line to the controller which detects and decodes the frequency signal and controls a display unit to provide a visual display of the liquid level in the selected tank.

17 Claims, 4 Drawing Figures

GAUGING SYSTEM PROVIDING REMOTE READOUT OF LIQUID LEVELS IN GASOLINE STORAGE TANKS

BACKGROUND OF THE INVENTION

1. Field of the Invention.

This invention relates to remote monitoring systems employing telephone links as a transmission medium, and more particularly to a system for providing remote monitoring of the liquid level in liquid storage tanks, such as underground gasoline storage tanks.

2. Description of the Prior Art.

For many years, gasoline stations were manned by full time attendants employed specifically to sell gasoline and other automotive products. One of the attendant's functions was the daily routine of measuring the liquid level in the storage tanks. This procedure was accomplished by opening the fill port of a tank, and lowering a calibrated pole into the tank until it touched the bottom of the tank. The pole was then withdrawn and the liquid level noted on the gauge. The information was then transferred to permanent records. The station manager would order fuel as required to maintain a desired inventory.

With the coming of the age of the fuel shortages, service stations begain to reclassify both to reduce operating costs, and to broaden product lines to increase profitability. More and more, the status of full service stations changed to that of self-service gasoline dispensing operations, with an attendant reduction in personnel, sometimes limited to only a cashier. This reduction in personnel dictated the need for an alternative method for monitoring the supply of gasoline on hand. Concurrently, chain stores, which dispensed food and or other items as a major product line, added self-service other items as a major product line, added self-service gasoline dispensing operations for the convenience of their customers. However, most laws preclude personnel who dispense food from handling fuel in any way, and this has created a new emphasis on gauging systems which do not require physical contact with the liquid.

The most common type of gauging system is referred to as a bubbler system. In this system compressed air is introduced in very small quantities into a tube which runs from the metering area to the gasoline tank where the tube is extended vertically through the tank to within an inch of the bottom of the tank. The air bubbles out of the bottom of the tube, displacing the gasoline, and the resultant pressure in the tube is proportional to the depth of the fluid in the tank. This pressure is sensed by a pressure gauge which provides a readout indicating the depth of gasoline in inches. One such system is marketed by Murphy Tank Company, of Tulsa, Okla. Another system of this type is marketed by Hersey Products, Inc., of Spartanburg, S.C. These systems are accepted as industry standards.

Although gauging systems are used for monitoring of available fuel in storage tanks in gasoline manufacturing plants, the gauging units associated with storage tanks are generally permanently connected to inventory control with in the plant. Such arrangement is not practical for remote monitoring of fuel inventories of self-service gasoline stations, or the like, due to the large number of self-service stations and the diverse locations of such stations. The installation of direct readout lines between gauging units at each of the locations and a readout unit at a central inventory control center would be prohibitive from a cost standpoint.

A further consideration is that frequently, storage capacity is not utilized effectively, particularly when the station manager is responsible for inventory control. This is in part because the station manager simply does not order fuel when he has the storage capacity. Also, in some instances the supplier cannot deliver needed fuel in time because the manager waits until the last possible minute before ordering the fuel. The additional cost resulting from making special overtime deliveries, as well as lost sales in the event of a run out of fuel, are of major concern to all of the oil companies.

SUMMARY OF THE INVENTION

The present invention provides a system which enables remote monitoring of inventories and, in particular, the remote monitoring of gasoline levels in underground storage tanks of self-service gasoline stations or the like. The system includes a controller at a central location and a transmitting unit at the location of the storage tanks. Data transmission between the controller and the transmitting unit, is effected over a telephone link which is established at the start of a readout operation.

The controller includes a transmitter which generates interrogate signals for transmission over the telephone link to the transmitting unit to select a tank, and a receiver which receives frequency signals provided by the transmitting unit indicating the gasoline level in the selected tank. The received information is displayed on a numeric display unit of the controller.

The transmitting unit includes a data transponder and a pressure sensing apparatus. The pressure sensing apparatus comprises an air compressor which is energized during each readout operation to establish a reference pressure in a manifold. A separate pressure sensing line is provided to each of the storage tanks, and the sensing lines are selectively connected to the manifold by way of solenoid valves. The pressure built up in the sensing line to a tank is in direct proportion to the depth of the gasoline in that tank.

The data transponder includes a sequencing circuit which responds to successive interrogate signals to energize the solenoid valves in sequence. As the solenoid valves are individually operated, the associated pressure sensing line is connected to the manifold, and a transducer monitors the pressure in the manifold as each of the sensing lines is connected thereto and generates a control output which causes a transponder transmitter to generate an audio signal related in frequency to the sensed pressure and thus to the depth of liquid in the selected storage tank.

In accordance with a feature of the invention, calibration is achieved within each tank by positioning the end of the sensing tube relative to the bottom of the tank to produce exactly the same minimum reading over all of the tanks. The use of a common transducer for sensing the pressure in all of the pressure sensing lines minimizes calibration problems.

Audio frequency signal transmission is employed for transmitting the information, and the audio frequency is correlated directly with the depth of the fluid in the tank in inches. This allows accurate readout by a relatively simple method of counting the frequency of the transmitted signal.

The use of a compressor in conjunction with the check valves to maintain pressure in the pressure lines assures that constant air volume and pressure are available. This provides a constant relationship between the pressure sensing lines so that they receive the proper air volume.

The use of conventional telephone lines as the transmission media makes the system practical for remote monitoring of the liquid levels in storage tanks at diverse locations. The controller is coupled to the telephone line at one end by way of a conventional telephone set which is used to establish a calling path between the controller and a telephone line coupler associated with the transmitting unig.

DESCRIPTION OF THE PREFERRED EMBODIMENT

Figure 1:
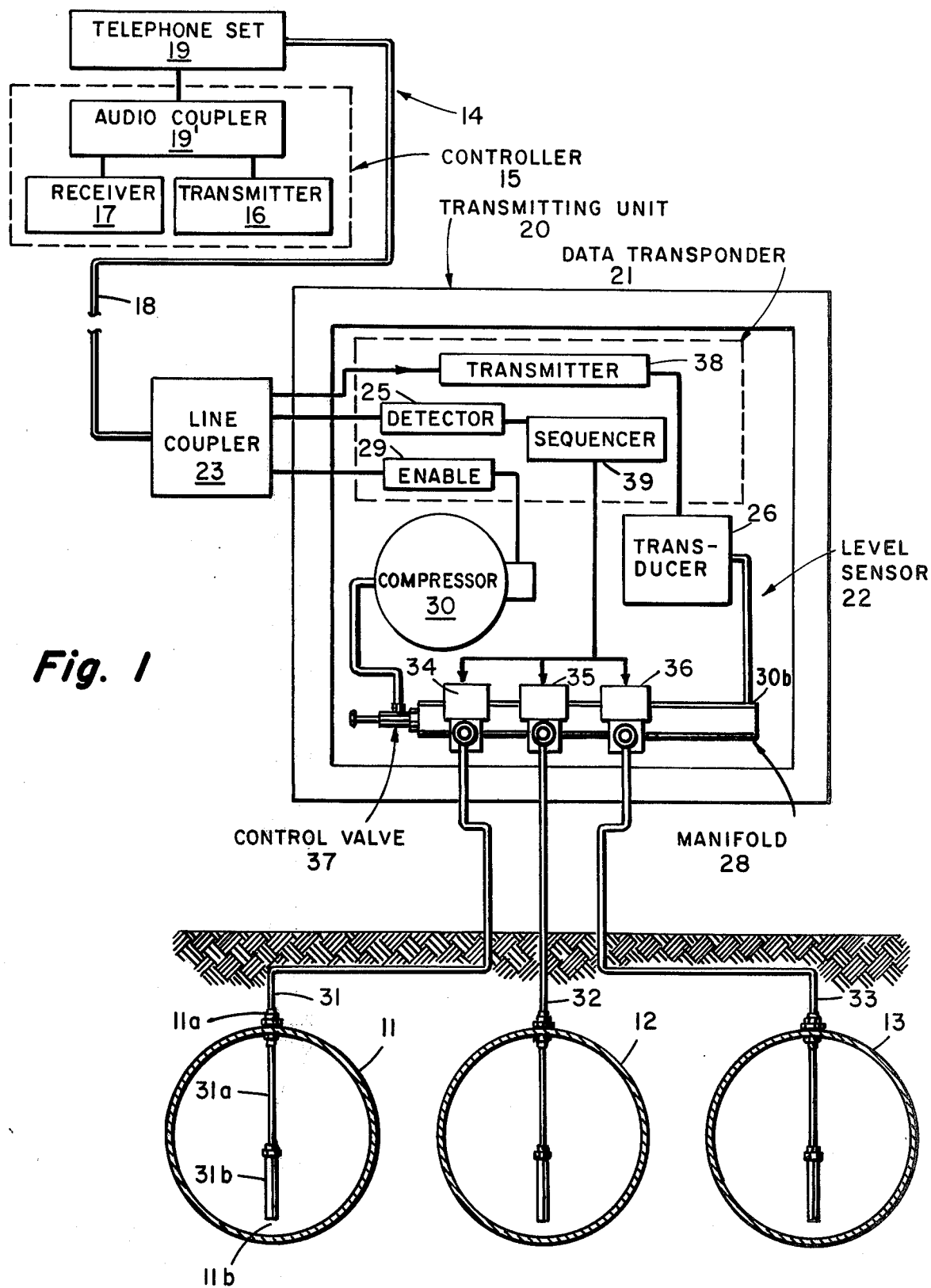
FIG. 1 is a simplified representation, partly in block diagram form, of a remote reading/gauging system provided by the present invention.

Referring to FIG. 1, the remote reading/gauging system is described with reference to an application for remote monitoring of fluid levels in a plurality of underground gasoline storage tanks 11–13 associated with gasoline pumps (not shown). The system is particularly suitable for use in the remote control of gasoline inventories for gasoline dispensing operations such as, a self-service gasoline station, or a retail store having a gasoline dispensing operation.

Figure 2:
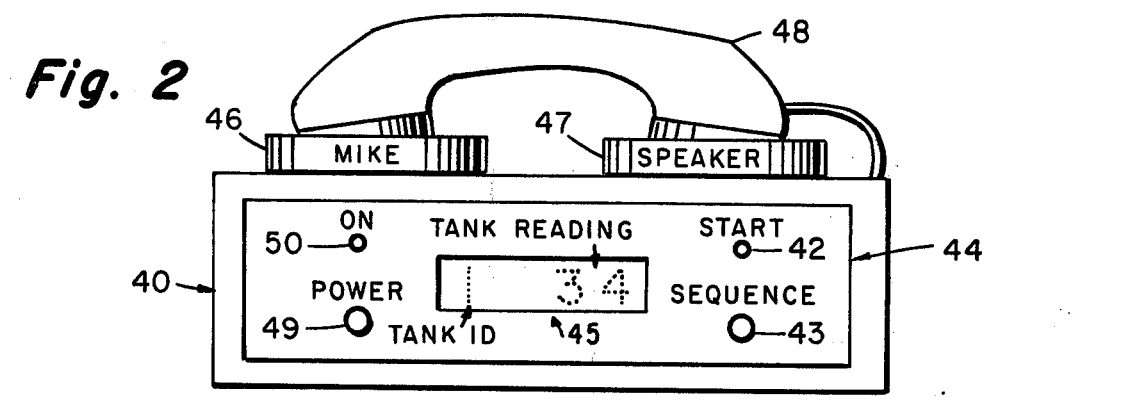
FIG. 2 is a plan view of a controller unit of the system shown in FIG. 1.

The system includes a controller 15 which is located at a monitoring location indicated generally at 14, such as in the office of the manager of petroleum product sales, and a transmitting unit 20 which is located at the site of the storage tanks 11–13. During a readout operation, the controller 15 generates interrogate signals which are transmitted to the transmitting unit 20 over a telephone line 18. The transmitting unit 20 responds to the interrogate signals to select each tank in sequence and to provide frequency coded signals representing the level of the gasoline in the selected storage tank. The frequency signals are transmitted to the controller 15 over the telephone line 18 where the signals are decoded, permitting the information to be displayed by way of a numerical display unit 45 (FIG. 2). The information displayed includes a reading of liquid level in inches for the selected tank, and the indentity of the tank.

Figure 3:
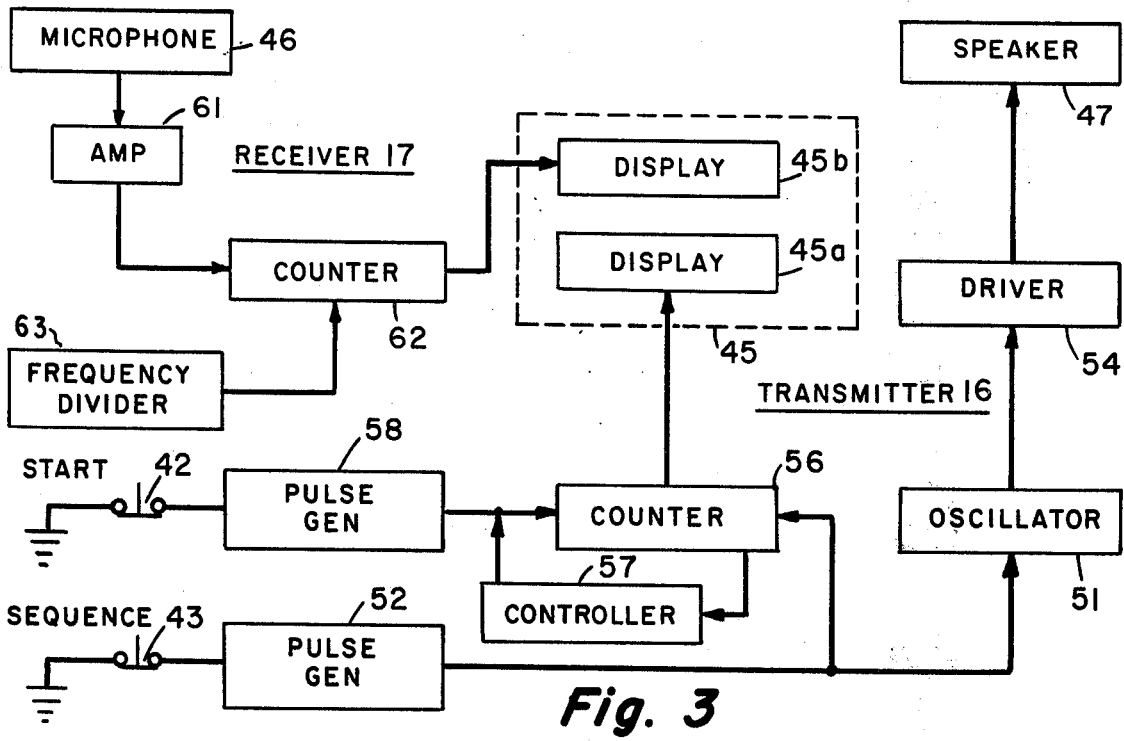
FIG. 3 is a block diagram of the circuits of the controller used in the system of FIG. 1.

More specifically, the controller 15 includes a transmitter 16, including an oscillator 51 shown in FIG. 3, which provides the interrogate signals, and a receiver 17 which receives and decodes the frequency coded signals provided by the transmitter unit 20. The controller transmitter 52 and the controller receiver 17 are acoustically coupled to the telephone line 18 by way of an audio coupler 19', comprised of a microphone 46 and a speaker 47 shown in FIG. 2, and a conventional telephone set 19. Telephone set 19 is also used in placing a call to a telephone line coupler 23 associated with the transmitting unit 20 to establish a telephone link between the controller 15 and at the start of a read out operation 11–13. One example of a line coupler suitable for this application is identified by the Bell System as Voice Connecting Arrangement CD9.

The transmitting unit 20 includes a data transponder 21 and a level sensing apparatus 22. The data transponder 21 includes a tone detector 25, an enabling circuit 29, and a sequencing circuit 39 which control the level sensing apparatus 22 to effect sequential readout of the fluid levels of the tanks 11–13. The data transponder 21 also includes a transmitter 38 which responds to a control output of the level sensing apparatus 22 to generate a signal coded in frequency to represent the fluid level in a selected tank. The frequency coded signal is transmitted back to the controller 15 over the telephone line 18. A decoupling network 27 (FIG. 4) interposed between the data transponder 21 and the line coupler 23 decouples the DC telephone line current from the data transponder.

The level sensing apparatus 22, includes pressure sensing lines 31–33 which extend into the tanks 11–13, respectively. Solenoid valves 34–36, which are selectively operated in sequence under the control of the sequencing circuit 39, connect the sensing lines 31–33 to an inlet of a manifold. An air compressor 30 is connected to a further inlet of the manifold 28 through a needle valve 37.

Compressor 30 is energized during a readout operation to maintain a reference pressure in the manifold 28 so that as the valves 34–36 are selectively operated to connect pressure lines 31–33 to the inlet of the manifold 28, the selected tank 11–13 is aerated via its pressure line. The pressure buildup in the pressure line for the selected tank is directly proportional to the depth of the liquid in that tank. This pressure is sensed by a transducer 26 which is connected to an outlet of the manifold 28.

The transducer 26 provides a control output, proportional to the pressure in the manifold, which controls the transmitter 38 to generate an audio frequency signal at a frequency related to the depth in inches of the liquid in the selected tank.

Controller Unit

Referring to FIG. 2, the controller unit 15 includes a cabinet 40 which houses the transmitter 16 and the receiver 17. A control/display panel 44 includes a start pushbutton 42 which is operated to reset the transmitter circuit 16 at the start of a readout operation, and a sequence pushbutton 43 which when operated causes the transmitter circuit 16 to generate an interrogate signal for transmission to the readout unit 20.

The control/display panel 44 also mounts a numerical display unit 45 which provides a display of a tank identification number, indicating which tank is being interrogated, and a three digit display of the liquid level of the tank in hundreds, tens, and units of inches.

A microphone 46 and a speaker 47, mounted in the top of the cabinet 40, form a cradle in which is received the handset 48 of the telephone set 19. The speaker 47 is connected to the output of the controller transmitter 16, and the microphone 15 connected to the input of the controller receiver 17. When the telephone hand set 48 is placed in the cradle, the output of the transmitter 16 is acoustically coupled via speaker 47 and the telephone transmitter to the telephone line, and the input of the controller receiver 17 is acoustically coupled via microphone 46 and the telephone receiver to the telephone line.

The controller 15 obtains power from a 120 VAC outlet and is energized whenever a power switch 49 is operated on. A power indicator lamp 50 is lit when the controller 15 is energized.

Controller Circuits

Referring to FIG. 3, the controller transmitter 16 includes a 2.7 KHz oscillator 51 and a pulse generator 52, such as a one-shot circuit, provides a trigger signal for enabling the oscillator 51. The pulse generator 52 is enabled each time the sequencing switch 43 is operated. The sequencing switch 43 is a spring loaded push button switch with its contacts biased normally closed to extend ground to the trigger input of the pulse generator 52. The interrogate signals are supplied over a driver circuit 54 to the speaker 47 which acoustically couples the interrogate signals to the telephone line 18 via the telephone transmitter.

The trigger signals from the pulse generator 52 also increment a decade counter 56 which controls a section 45a of the display unit which provides the display of the tank idenification number. The counter 56 is stepped one count by each trigger signal to identify the source of the data received from the readout unit. The counter 56 is reset in response to operation of the start switch 42 which when operated enables a further pulse generator 58, which may also be a one-shot circuit, to provide a reset signal to the decade counter 56. A controller 57 responds to the output of the counter 56 to reset the counter 56 after the three storage tanks 11-13 have been interrogated, so that with the next trigger signal the identification number "1" for tank 11 is displayed. Switch 42, which is also a spring biased pushbutton switch, has its contacts biased normally closed to extend ground to the trigger input of the pulse generator 58.

The controller receiver 17 comprises an amplifier 61 having its input connected to the output of the microphone 46 which is coupled to the telephone receiver. The output of the amplifier is connected to a count input of a counter 62 which counts the frequency of the received signal and controls a further portion 45b of the display unit to provide the three digit reading of the tank level. The counter 62 is reset once each second by a reset signal at a frequency of ½ Hz which is derived by counting down the 60 Hz AC line frequency by way of a frequency divider circuit 63 so that the counter counts cycles per second.

The display unit 45 is a conventional LED display unit and display sections 45a and 45b include suitable digit decoder/drive circuits which respond to digital outputs of the counters 56 and 62 to display the appropriate numerics. The decoder circuits associated with the tank level display section 45b receive inputs representing the binary coding of the three most significant digits of the count registered by counter 62, and are connected to subtract "one" from the most significant digit. The display section logic 45b also provides initial zero blanking. Thus, if the counter 62 registers a count of 1340, which corresponds to a depth of 34 inches, the display will indicate 34 inches.

Transmitting Unit

Referring again to FIG. 1, the transmitting unit 20 is preferably located within 100 feet of each of the tanks 11-13, and convenient to a source of 120 VAC for energizing the transmitting unit. Each of the pressure sensing lines 31-33 is 100 feet in length and may comprise a section 31a of a quarter inch polyvinal floride tube, with the end which extends into the tank being fitted with a two foot section of one-half inch pipe, such as pipe 31b for sensing lines 31, for weighting the tube. Each pressure sensing line, such as line 31, is extended into its associated tank, tank 11 for line 31, by way of the tank plug 11a or a suitable bushing. The tube 31 extends into the tank 11 with the outlet of the one-half inch pipe portion 31a being positioned approximately five inches above the bottom of the tank 31 defining a gap 11b therebetween. The spacing between the end of the line 31 and the bottom of the tank is the means of fine tuning the pressure sensing lines 31-33. Calibration is achieved within each tank by adjusting the depth of the lines 31-33 in respective tanks 11-13 to produce the same minimum reading for all of the tanks. The use of a common pressure to voltage transducer 26 for monitoring the pressure in all three tanks 11-13 eliminates the problem of calibrating multiple transducers into a single output circuit. The accuracy of the overall system is 0.3 inches in depth for a tank thirty-four feet deep.

The pressure sensing lines 31-33 are preferably of exactly the same length to eliminate the need for individual adjustments. However, if for any reason individual adjustments should be required, the distance between the end of the pressure sensing lines and the bottom of the tanks may be increased or decreased for different length sensing lines by lowering the end one-half inch closer to the tank bottom for each additional ten feet of length for the line over 100, and conversely, by raising the end one-half inch further from the tank bottom for each foot removed from the line.

The compressor 30 and the check valves 34-36 maintain pressure in the sensing lines 31-34 and assure that constant air volume and pressure are provided, so that the pressure buildup in the lines 31-33 is in direct proportion to the depth of the gasoline in respective tanks 11-13. The compressor 30, when energized, meters air into the manifold 28 at a pressure equal to a 5" column of water. The compressor 30 is energized by the enabling circuit 29 which responds to the ringing signal provided when a connection is established between the telephone set 19 and the coupler 23. A needle valve 37 installed between the compressor outlet and the manifold inlet tapping 30a controls the flow of air from the compressor to the manifold and thereby the back pressure.

The solenoid valves 34-36, which are commercially available celluloid valves, are individually energizable under the control of the sequencing circuit 39.

The transducer 26, which is commercially available from Bourns, has its pressure inlet connected to a manifold outlet tapping 30b, and a signal output connected to a control input of the transponder transmitter 38. The transducer output varies in correspondence with variation in sensing line pressure and thus depth of gasoline in the storage tanks. The transponder output controls the transmitting frequency of the transponder transmitter 38 in correlation with the depth of fluid in the tanks.

Referring to the data transponder 21, the interrogate signals transmitted by the controller 15 are detected by the detector circuit 25 and transformed into suitable digital levels for application to the sequencing circuit 39. With the receipt of the first interrogate signal, the sequencing circuit enables the first solenoid valve 34 to open, connecting sensing line 31 to the manifold, thereby aerating tank 11 while the manifold pressure is monitored by the transducer 26. The transducer 26 controls the transmitter 38 to cause it to generate a frequency signal indicative of the depth of fluid in tank 11. With the receipt of the next interrogate signal, the sequencing circuit 39 causes valve 34 to close and valve 35 to open, and the pressure in sensing line 32 is sensed by the transducer 26, and via transmitter 38 the reading is transmitted to the controller 15. The next interrogate signal effects the reading of the liquid level in tank 13, and after the information indicating the liquid levels in all three tanks 11-13 has been obtained, the process is restarted automatically with readout of the liquid level information for tank 11. Upon completion of a desired number of readout cycles, the process is terminated.

Data Transponder Circuits

Figure 4:
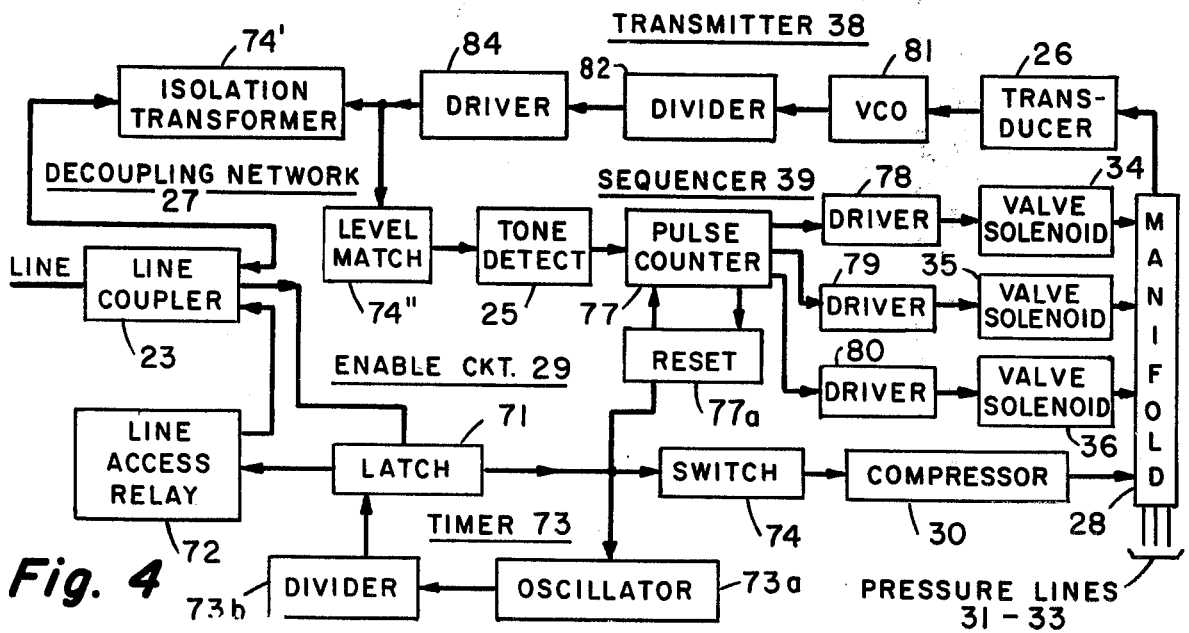
FIG. 4 is a block diagram of circuits of a transmitting unit of the system shown in FIG. 1.

Referring to FIG. 4, the enabling circuit 29 includes a latch circuit 71, a line access relay 72 and a timer circuit 73. The ringing signal received when a calling path is completed between the transmitting unit 20 and the telephone 19, is extended over the line coupler 23 to the latch circuit 71 which is thus set. The latch circuit 71 provides a control output for enabling the relay 72 to operate to effect line seizure. The relay also applies power to the data transponder 21 and couples it to the telephone line over the line coupler 23. The latch circuit 71 also enables a switch 74 which operates to connect power to the compressor 30, energizing the compressor 30.

When the data transponder 21 is connected to the telephone line, the 2.7 KHz interrogate signals transmitted by the controller transmitter are extended over decoupling network 27 to the tone detector 25. The decoupling network 27 includes an isolation transformer 74' and a level matching circuit 74". The isolation transformer 74' provides DC isolation between the telephone line and the data transponder circuits 21, and the level matching circuit provides an impedance match between the line and the tone detector 25. The tone detector 25 converts the frequency signals into digital levels for application to the court input of a pulse counter 77 of the sequencing circuit 39. A reset circuit 77a, which may be a one-shot circuit, is enabled when the latch circuit 71 is set and generates a reset pulse for the pulse counter 77. The sequencing circuit also includes driver circuits 78—80 which control the enabling of the solenoid valves 34-36, respectively.

The transponder transmitter 38 includes a voltage controlled oscillator (VCO) 81 which generates a frequency output in the range of 100 KHz to 250 KHz.

The frequency output of the voltage controlled oscillator 81 is divided by 100 by frequency divider circuit 82 to the audio range of 1 KHz to 2.5 KHz. The divider circuit 82 reduces the frequency output of the voltage controlled oscillator 81 to a basic zero reading of 1 KHz. Variation in depth of the liquid level in a tank selected for readout causes the transducer output to increase so that the divider circuit output ranges up to 2.2 KHz at a depth of ten feet. That is, an output frequency of 1 KHz corresponds to zero and an output frequency of 2.2 KHz corresponds to a level of 120 inches above zero. The actual count is the frequency in Hertz divided by ten.

The frequency output of the divider circuit 82 is extended over a driver circuit 84 and the isolation transformer 74' to the telephone line for transmission to the controller unit.

The timer circuit 73 includes an oscillator 73a enabled when latch 71 is set and generates a signal which is divided down by frequency divider circuit 73b to provide a reset signal for the latch 71 after a three minute interval.

Operation

Referring to FIG. 2, to initiate readout of the levels of gasoline stored in tanks 11-13, the operator operates the powder switch 49 on to energize the controller 15. Then the operator uses the telephone set 19 to place a telephone call to the number assigned to the line coupler 23. When the telephone connection is established between the telephone set 19 and the line coupler 23, the operator places the handset 48 in the cradle of the controller cabinet.

Referring to FIG. 1, the ringing signal provided over the telephone line 18 when the call is placed is extended over the line coupling network 23 and the enabling circuit 29. The ringing signal sets the latch circuit 71 (FIG. 4) which enables the line access relay 72 which operates to complete the connection between the data transponder and the line coupling network 23. The latch circuit also enables switch 74 to energize the compressor 30, enables reset circuit 77a to reset counter 77, and enables oscillator 73a of the timing network.

When the compressor 30 is energized, air is supplied to the manifold 28 by way of the needle valve 37 establishing a pressure in the manifold 28.

With reference to FIGS. 3 and 4, when the connection is established, and with the compressor 30 now running, the operator first depresses the start switch 42 enabling the pulse generator 58 to provide a reset signal for the counter 56. The operator then depresses the sequence pushbutton 43 which enables pulse generator 52 to generate a pulse which steps the counter 56 to a count of one. The outputs of the counter 56 control the tank ID display 45a which provides a numerical of display of 1, as shown in FIG. 2, indicating that the fluid level in the first tank 11 is being read out.

The pulse output of generator 52 also enables oscillator 51 which generates a 2.7 KHz signal. This signal is coupled to the telephone line 18 via driver 54, speaker 47 and the telephone handset transmitter and is coupled over the line coupling network 23 and extended over the isolation transformer 74' and the level matching network 74" to the input of the tone detector 25. The tone detector 25 responds to the signal to step the pulse counter 77 of the sequencing circuit 39. This causes driver 78 to be enabled effecting energization of the solenoid valve 34. Accordingly, valve 34 opens connecting pressure line 31 to the input of the manifold 28. Air under pressure flows through the sensing line 31 into the tank 11 (FIG. 1) displacing the gasoline and causing the pressure in the line 31 and thus at the inlet of the manifold to buildup to a value related to the depth of the gasoline in tank 11. The transducer 26 senses the pressure in the manifold 28 when valve 34 is open and controls the voltage controlled oscillator to generate a signal at a frequency, 134 KHz, in this example, which is related to the depth of the liquid in tank 11. The frequency output of the voltage controlled oscillator 81 is divided by 100 by frequency divider circuit 82 providing a signal output at a frequency of 1.34 KHz. This signal is extended over driver circuit 84 and coupled over isolation transformer 74' to the line coupler 23 and transmitted back to the controller 15.

Referring to FIGS. 2 and 3, the frequency signal is coupled to the controller receiver 17 by way of the handset receiver and microphone 46 and is amplified by amplifier 61 and supplied to the count input of counter 62. The counter 62, which is reset at one second intervals under the control of the frequency divider circuit 63, counts the frequency of the received signal and controls the tank level display 45b to provide a display of 34 inches, which corresponds to the level of gasoline in the tank 11.

After the operator has noted the reading, he then operates the sequencing pushbutton 43 to effect reading of the level in tank 12. The sequence of operation is the same as that described above, with the controller counter 56 being stepped to a count of 2 causing the tank indicator display to change to 2. The pulse counter 77 of the sequencing circuit 39 is stepped disabling driver 78 and enabling driver 79 so that valve 34 is deenergized and valve 35 is energized, connecting sensing line 32 associated with tank 12 to the manifold 28. The transducer 26 senses the pressure in line 32 and controls transmitter 38 to generate frequency signals representing the depth of the gasoline in tank 12, and such signals are detected by the controller receiver, effecting a display of the information on the display unit 45. The gasoline level for tank 13 is readout in a similar manner.

After the readings for tanks 11-13 have been obtained, the readout sequence may be repeated if desired to check the data logged by the operator. When the operator returns the telephone handset to its telephone cradle, the call is terminated, and at the transmitting unit 20, the line access relay is deenergized by timer circuit 73 causing the compressor to be deenergized.

It is pointed out that while only one set of storage tanks 11-13 and associated transmitting unit is shown, the system is intended for use in remote monitoring of liquid levels in groups of storage tanks at a plurality of installations, there being an individual transmitting unit provided for each installation, with all of the transmitting units being controlled by a common controller, such as controller 15.

Thus, after gasoline level data from the storage tanks 11-13 has been obtained, the operator may call a transmitting unit associated with further storage tanks and obtain gasoline level information for such tanks.

Having thus disclosed in detail a preferred embodiment of my invention, persons skilled in the art will be able to modify certain of the structure which has been disclosed and to substitute equivalent elements for those which have been illustrated, and it is, therefore, intended that all such modifications and substitutions be covered as they are embraced within the spirit and scope of the appended claims.

I claim:

1. In a system for effecting the readout from a first location of information indicating the liquid level in each of a plurality of liquid storage tanks at a second location; the improvement comprising: controller means at said first location including first transmitter means for generating interrogate signals for transmission over a telephone link to said second location, readout means at said second location including level sensing means having a plurality of level sensors each associated with a different one of said storage tanks, and transponder means associated with said level sensing means and including select means responsive to said interrogate signals to select each of said level sensors in sequence to enable said level sensing means to provide a control output as each level sensor is selected, each control output being indicative of the depth of the liquid in the storage tank associated with the selected level sensor, and second transmitter means responsive to each control output to generate an information signal related in frequency to the depth of the liquid in the tank associated with the selected level sensor for transmission over said telephone link to said first location; said controller means further including receiving means for receiving said information signal and providing an output indicative of the depth of the liquid in the storage tank associated with the selected level sensor.

2. A system as set forth in claim 1 wherein said receiving means comprises display means for providing a numerical display of the liquid level represented by the received information signal.

3. A system as set forth in claim 2 wherein the frequency of the information signal generated by said second transmitter means corresponds to the depth of the liquid in a predetermined unit of measure, said receiving means including frequency counting means operable to count the frequency of the information signal and provide control outputs for said display means indicative of the frequency of the information signal.

4. A system as set forth in claim 2 wherein said controller means includes initiating means for controlling said first transmitter means to effect the generation of each interrogate signal and means responsive to said initiating means to cause said display means to provide an indication of the identity of the storage tank associated with the selected level sensor.

5. A system as set forth in claim 1 wherein each of said level sensors comprises a pressure sensing line extending into the associated storage tank, and said level sensing means includes control means for permitting a pressure to be established in each sensing line which is related to the depth of the liquid in the associated storage tank, and transducer means for sensing the pressure in each sensing line, as it is selected, and providing a control output related to the sensed pressure.

6. A system as set forth in claim 5 wherein said control means includes a manifold, an air compressor means operable when energized to supply air to said manifold, said transducer means being connected to an outlet of said manifold for sensing the pressure in said manifold, and a plurality of check valves each individually operable under the control of said select means to connect an inlet of a different one of said sensing lines to an inlet of said manifold, thereby coupling the selected sensing line to said transducer means.

7. In a system for effecting the readout from a first location of information indicating the liquid level in each of a plurality of liquid storage tanks at a second location; the improvement comprising: controller means at said first location including first transmitter means for generating interrogate signals, and means for coupling said interrogate signals to a telephone link for transmission thereover to said second location; level sensing means at said second location including a plurality of pressure sensing lines each associated with a different one of said storage tanks, and means for establishing a pressure in said sensing lines which is related to the depth of the liquid in the associated storage tank, and transponder means associated with said level sensing means and coupled to said telephone link, said transponder means including select means responsive to different ones of said interrogate signals to select a different one of said sensing lines, pressure transducer means for sensing the pressure in the selected sensing line and for providing a control output corresponding to the sensed pressure, second transmitter means responsive to each control output for generating an information signal related in frequency to the pressure in the selected sensing line, and means for coupling said information signal to said telephone link for transmission thereover to said first location; said controller means further including receiving means coupled to said telephone link for receiving said information signal and decoding means for decoding said information signal and providing an output indicative of the depth of the liquid in the storage tank associated with the selected sensing line.

8. A system as set forth in claim 7 wherein said decoding means includes display means for providing a numerical display of the liquid level represented by the received information signal.

9. A system as set forth in claim 8 wherein the frequency of the information signal generated by said second transmitter means corresponds to the depth of the liquid in a predetermined unit of measure, and said decoding means further comprises frequency counting means operable to count the frequency of the information signal and provide control outputs for said display means indicative of the frequency of the information signal.

10. A system as set forth in claim 8 wherein said first transmitter means includes oscillator means, initiating means operable to provide a pulse for enabling said oscillator means to generate an interrogate signal, and pulse counting means for counting each enabling pulse as it is provided and for causing said display means to provide an indication of the number of interrogate signals generated thereby identifying the storage tank associated with the numerical representation of liquid level being displayed.

11. A system as set forth in claim 7 wherein said second transmitter means generates information signals in the audio frequency range.

12. A system as set forth in claim 7 wherein said means for establishing a pressure in said sensing lines includes a manifold, an air compressor means operable when energized to supply air to said manifold, said transducer means being connected to an outlet of said manifold for sensing the pressure in said manifold, and a plurality of check valves each individually operable under the control of said select means to connect an inlet of a different one of said sensing lines to an inlet of said manifold thereby coupling the selected sensing line to said transducer means.

13. A system as set forth in claim 7 wherein said first transmitter means and said receiving means are acoustically coupled to said telephone link.

14. A method for providing readout from a first location of information indicating the liquid level in each of a plurality of liquid storage tanks at a second location comprising:

establishing a telephone link between the first and second locations;

transmitting an interrogate signal over the telephone link from the first location to the second location to select one of a plurality of pressure sensing lines, each of which is associated with a different one of the storage tanks;

establishing a pressure in the selected sensing line which is related to the depth of the liquid in the associated storage tank;

sensing the pressure in the selected sensing line by way of a pressure sensing transducer;

generating a signal at a frequency related to the sensed pressure and transmitting the frequency signal over the telephone link from the second location to the first location;

detecting the frequency of the signal by way of a detecting circuit and providing an output indicative of the depth of the liquid in the storage tank associated with the selected sensing line.

15. A method as set forth in claim 14 which includes displaying a numerical representation of the depth of the liquid in the storage tank associated with selected sensing line.

16. A method as set forth in claim 15 which includes displaying a numerical representation of the identity of the storage tank for which the liquid level is being displayed.

17. A method as set forth in claim 14 which includes energizing an air compressor to establish a reference pressure in a manifold, and the step of selecting a sensing line includes connecting the selected sending line to the manifold.

* * * * *